May 27, 1947.  R. W. LUCE  2,421,278
NUT STRUCTURE
Filed March 30, 1944

INVENTOR
RICHARD W. LUCE
BY
George F. Gill
ATTORNEY

UNITED STATES PATENT OFFICE 2,421,278

NUT STRUCTURE

Richard W. Luce, Southport, Conn.

Application March 30, 1944, Serial No. 528,662

1 Claim. (Cl. 85—32)

The invention herein disclosed relates to a nut structure of the kind in which a retainer is utilized to retain a nut in position on a structural member.

Nut structures of the kind to which this invention relates commonly comprises a nut retainer which includes a strip on which one or more nuts are mounted. The retainer is commonly in the form of a channel and the nut is mounted therein with the face of the nut engaging the strip. The strip is provided with a bolt hole in alignment with the axis of the nut and the retainer is commonly secured to a structural member by being riveted thereto. Such nut structures are particularly adapted, and generally used in the aircraft industry, where blind fastenings are required and where the structural member, to which another member is to be removably secured, cannot be tapped.

As heretofore constructed, the strip of the retainer member is between the face of the nut and the structural member against which the nut should be drawn home. This is an undesirable condition as the forces acting radially of the bolt, in the shifting of plates secured together for example, do not act as normally in pure shearing stress because the nut is spaced from one of the members by the strip of the nut retainer. An object of this invention is to provide a nut structure of this kind in which the engaging face of the nut engages directly one of two members being secured together by the nut and a bolt entered therein. Another object of the invention is to provide a nut structure of this kind in which the nut has limited movement in all lateral directions to provide for misalignment of fastening and bolt openings.

The foregoing objects and certain advantages that will hereinafter appear are realized in the embodiment of the invention illustrated in the accompanying drawing and described in detail below.

Figure 1:
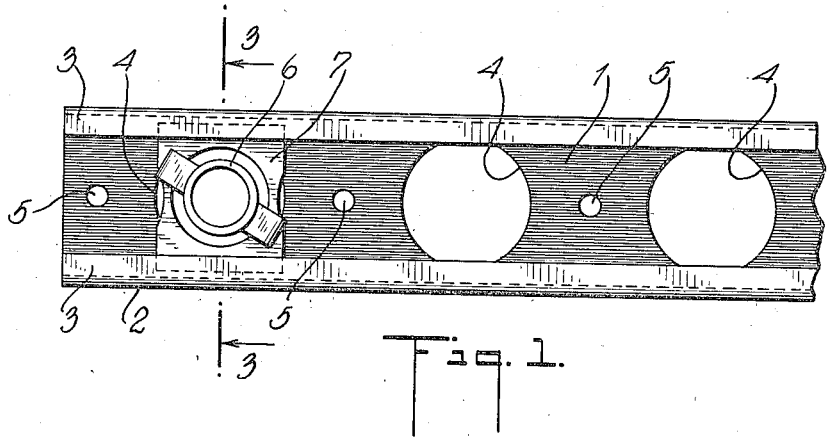
Figure 2:
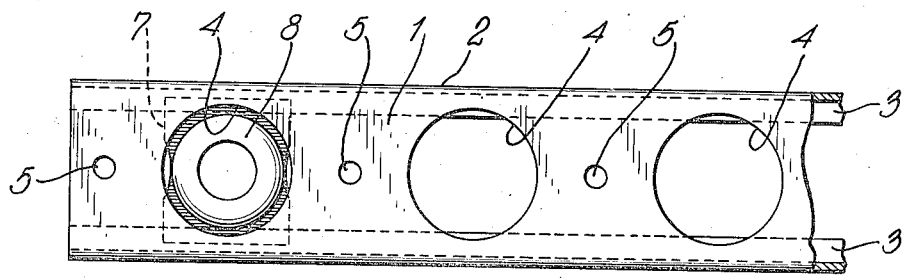

The drawings include:

Fig. 1 which is a plan view of a nut structure embodying the invention;

Fig. 2 which is a bottom plan view of the same; and

Figure 3:
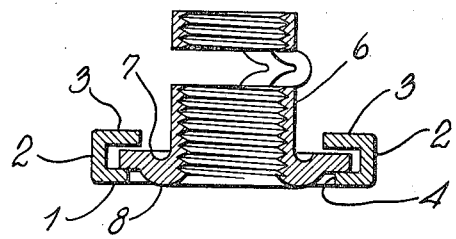

Fig. 3 which is a transverse section of the same taken on the line 3—3 of Fig. 1.

In the nut structure illustrated in the drawings, there is shown a nut retainer for a multiple nut structure. However, the invention is equally suitable for a nut structure having but a single nut and a retainer suitable for a single nut. The retainer illustrated is of the kind which is commonly called a gang channel nut structure.

The nut retainer consists of a strip 1 which constitutes the web of a channel, side walls 2 extending perpendicular to the strip 1 at the side edges thereof, and inturned flanges 3 extending inwardly from the edges of the side walls and parallel to the plane of the strip 1. The strip is provided, at spaced intervals with relatively large openings 4 therethrough with which nuts are aligned. Intermediate the openings 4 and at spaced intervals along the strip, there are relatively smaller openings 5 through the strip. These latter openings are provided to receive rivets by means of which the nut retainer may be secured to a plate or other structural member.

The nut illustrated is of the kind shown and described in my prior Patent No. 2,265,661, issued December 9, 1941. It consists of a threaded section 6 and a laterally extending base 7. The diameter of the threaded section is much smaller than the diameter of the opening 4 through the strip of the nut retainer. The base 7 of the nut is substantially square and opposite edges extend under the inturned flanges 3. While the width of the base is less than the distance between the side walls 2 of the nut retainer, the length of the diagonal of the base is greater than the distance between the side walls. Thus, the nut is held against relative rotation with respect to the nut retainer while free to move a limited extent transversely of the nut retainer. As the width of the base is greater than the distance between the edges of the inturned flanges 3, the nut is held in the retainer.

The base of the nut is provided with an offset engaging face portion 8 which is circular and of lesser diameter than an opening 4. The nut is mounted in the retainer axially aligned with an opening 4 and the offset face portion 8 extends into the opening. The offset of the face portion 8 is equal to the thickness of the strip 1 of the nut retainer so that the engaging face portion of the nut is flush with the engaging surface of the nut retainer.

The inturned flanges 3 hold the base of the nut such that the offset face portion 8 cannot withdraw from the opening 4. Thus, the nut is restrained against movement longitudinally of the strip by engagement of the offset face portion 8 with the edge of the opening 4. As the diameter of the opening 4 is greater than the diameter of the offset portion of the nut, the nut has limited movement longitudinally of the strip 1. Thus, the nut has float or limited movement in all lateral directions to accommodate for misalignment of the holes in the structural member to which the nut structure is attached.

It will be seen from the foregoing that by this invention there is provided a nut structure in which the engaging face of the nut engages the structural member to which the nut structure is secured.

It will be obvious that various changes may be made by those skilled in the art in the embodiment of the invention illustrated in the drawing and described in detail above within the principle and scope of the invention as expressed in the appended claim.

I claim:

A nut structure comprising in combination a nut retainer including a strip adapted to be secured to one of two members to be secured together, and a nut retained by said nut retainer and having an engaging face substantially flush with the engaging surface of the strip of the nut retainer.

RICHARD W. LUCE.

REFERENCES CITED

The following references are of record in the file of this patent:

UNITED STATES PATENTS

| Number | Name | Date |
|---|---|---|
| 2,146,128 | Oldham | Feb. 7, 1939 |
| 2,165,765 | Place | July 11, 1939 |
| 2,249,923 | Whitcombe | July 22, 1941 |
| 2,299,158 | Luce | Oct. 20, 1942 |
| 2,265,661 | Luce | Dec. 9, 1941 |